United States Patent
Fontana et al.

(10) Patent No.: US 10,333,299 B2
(45) Date of Patent: Jun. 25, 2019

(54) POWER CONVERTER AND METHODS FOR INCREASING POWER DELIVERY OF SOFT ALTERNATING CURRENT POWER SOURCE

(71) Applicant: ABB Schweiz AG, Baden (CH)

(72) Inventors: Edward Clark Fontana, Rockwall, TX (US); Tab O Walter, Plano, TX (US); Roy Jaescentt Davis, Rowlett, TX (US); Palanivel Subramaniam, Richardson, TX (US)

(73) Assignee: ABB Schweiz AG, Baden (CH)

( * ) Notice: Subject to any disclaimer, the term of this patent is extended or adjusted under 35 U.S.C. 154(b) by 562 days.

(21) Appl. No.: 14/195,594

(22) Filed: Mar. 3, 2014

(65) Prior Publication Data

US 2014/0306526 A1    Oct. 16, 2014

Related U.S. Application Data

(60) Provisional application No. 61/773,040, filed on Mar. 5, 2013.

(51) Int. Cl.
| | |
|---|---|
| *H02J 1/12* | (2006.01) |
| *H02J 3/00* | (2006.01) |
| *H02M 1/42* | (2007.01) |
| *H02J 3/38* | (2006.01) |

(52) U.S. Cl.
CPC .............. *H02J 3/00* (2013.01); *H02M 1/4208* (2013.01); *H02J 3/381* (2013.01); *H02J 3/386* (2013.01); *Y02B 70/126* (2013.01); *Y02E 10/763* (2013.01); *Y10T 307/352* (2015.04)

(58) Field of Classification Search
CPC . H02J 3/00; H02J 3/18; H02M 1/4208; Y10T 307/352; Y02B 70/126
USPC .......................................................... 307/24
See application file for complete search history.

(56) References Cited

U.S. PATENT DOCUMENTS

| | | | |
|---|---|---|---|
| 6,118,676 | A | 9/2000 | Divan et al. |
| 7,541,696 | B2 | 6/2009 | Dawley |
| 7,631,627 | B2 | 12/2009 | Sarbacker et al. |
| 7,852,639 | B2 | 12/2010 | Sells |
| 8,542,507 | B2 | 9/2013 | Hsu et al. |

(Continued)

FOREIGN PATENT DOCUMENTS

| | | |
|---|---|---|
| CN | 101953060 A | 1/2011 |
| CN | 102067437 A | 5/2011 |

(Continued)

OTHER PUBLICATIONS

Hengchun Mao et al., "High Performance Three-Phase Power Factor Correction Circuits", IEEE, 1995, pp. 8-14.

(Continued)

*Primary Examiner* — Rexford N Barnie
*Assistant Examiner* — Toan T Vu
(74) *Attorney, Agent, or Firm* — Barnes & Thornburg LLP

(57) ABSTRACT

A power converter is provided that includes a detection circuit configured to determine a power source type based on at least one characteristic of power received from a power source. The detection circuit is also configured to determine an operating edge of the soft AC source by monitoring at least one parameter as the soft AC power source approaches a power limit, and assign an operating point to the soft AC power source based on the operating edge to increase power delivery of the soft AC power source.

20 Claims, 3 Drawing Sheets

(56) References Cited

U.S. PATENT DOCUMENTS

| | | |
|---|---|---|
| 2008/0150366 A1 | 6/2008 | Adest et al. |
| 2008/0246338 A1* | 10/2008 | Donnelly ............... B60L 11/123 307/54 |
| 2010/0006551 A1* | 1/2010 | Geissler ............... B23K 9/1018 219/130.1 |
| 2011/0006600 A1* | 1/2011 | Fontana ................... H02J 1/10 307/25 |
| 2011/0215640 A1* | 9/2011 | Donnelly ................. H02J 1/10 307/21 |
| 2012/0267892 A1* | 10/2012 | Matsuda ................ F03D 7/022 290/44 |
| 2012/0300510 A1 | 11/2012 | Jensen et al. |
| 2013/0099565 A1* | 4/2013 | Sachs ........................ H02J 3/46 307/25 |
| 2013/0106108 A1 | 5/2013 | De Boer et al. |
| 2013/0113436 A1* | 5/2013 | Ishibashi ............... H02J 7/0013 320/136 |
| 2013/0258718 A1 | 10/2013 | Pankratz |
| 2017/0331325 A1* | 11/2017 | Ristau ....................... H02J 9/04 |

FOREIGN PATENT DOCUMENTS

| | | |
|---|---|---|
| CN | 102684183 A | 9/2012 |
| WO | 2008132553 A2 | 11/2008 |
| WO | 2009140551 A2 | 11/2009 |

OTHER PUBLICATIONS

Annabelle Van Zyl et al., Voltage Sag Ride-Through for Adjustable-Speed Drives With Active Rectifiers, IEEE Transactions on Industry Applications, Nov./Dec. 1998, pp. 1270-1277, vol. 34, No. 6.

Naidoo, R., "A New Method of Voltage Sag and Swell Detection", IEEE Transactions on Power Delivery Apr. 2007, pp. 105-1063, vol. 22, Issue 2.

PCT International Search Report and Written Opinion from PCT Application No. PCT/US2014/020191 dated Jun. 25, 2014.

Unofficial English Translation of Chinese Office Action issued in connection with corresponding CN Application No. 201480012843.1 dated Feb. 24, 2017.

* cited by examiner

POWER CONVERTER AND METHODS FOR INCREASING POWER DELIVERY OF SOFT ALTERNATING CURRENT POWER SOURCE

CROSS REFERENCE TO RELATED APPLICATIONS

This application claims priority to U.S. Provisional Application No. 61/773,040 filed Mar. 5, 2013, which is hereby incorporated by reference in its entirety.

BACKGROUND

The field of the invention relates generally to power conversion, and more particularly, to a power converter and methods of increasing power delivery from soft AC power sources.

Telecommunications and other direct current (DC) based power plants typically use multiple alternating current (AC) and/or DC power sources to provide power to a load. At least some known AC power sources use rectifiers to convert AC output voltages to a regulated DC output, and at least some known DC power sources use DC-DC converters to adjust their voltage levels to a regulated DC output. A DC bus aggregates the DC outputs and enables them to power the load. The rectifiers and/or the DC-DC converters are typically managed by a system controller that allocates the load among the multiple power sources.

In system applications, rectifiers may receive AC power from the grid or from "soft" AC sources. A soft AC input power source is a source having a limited current sourcing capability, in that a large enough load at an output of a power converter can draw down the input voltage and cause the source to shutdown, go into current limiting, become unstable, oscillate, or trip an input detector. For example, a soft AC power source is one that cannot deliver enough current to clear a 20-30 Amp input threshold, or delivers a current that is less than 5% of a maximum tolerated range. Soft AC input power sources may include, but are not limited to including, a diesel generator (also referred to as a "genset"), an inverter, a wind-powered generator, or any other fuel-powered generator. Such soft AC input power sources are configured to leave excess source capacity on tap for reliable operation. When the soft source is a genset, a sum of rectifier loads, battery recharge, and other loads, such as air conditioner/heating loads is typically sized not to exceed about 80% of the genset rating at sea level. As a result, recharge rate is limited and generator run times are extended when air conditioning/heating is not needed. Extended run times cause waste of fuel. A similar soft source problem occurs when rectifiers run off wind-powered generators where the source is variable over time as the wind speed changes.

BRIEF DESCRIPTION

In one aspect, a power converter is provided. The power converter includes a detection circuit configured to determine a power source type based on at least one characteristic of power received from a power source. The detection circuit is also configured to determine an operating edge of the soft AC source by monitoring at least one parameter as the soft AC power source approaches a power limit, and assign an operating point to the soft AC power source based on the operating edge to increase power delivery of the soft AC power source.

In another aspect, a method is provided that includes determining a power source type based on at least one characteristic of power received from a power source, and when a soft AC source is determined to be the power source type, determining an operating edge of the soft AC source by monitoring at least one parameter as the soft AC power source approaches a power limit. The method also includes assigning an operating point to the soft AC power source based on the operating edge to increase power delivery of the soft AC power source.

In yet another aspect, a power converter system is provided. The power converter system includes a plurality of power sources, a direct current (DC) bus for providing power to at least one load, and a power converter. The power converter includes a detection circuit configured to determine a power source type based on at least one characteristic of power received from a power source. The detection circuit is also configured to determine an operating edge of the soft AC source by monitoring at least one parameter as the soft AC power source approaches a power limit, and assign an operating point to the soft AC power source based on the operating edge to increase power delivery of the soft AC power source.

DETAILED DESCRIPTION

Figure 1:
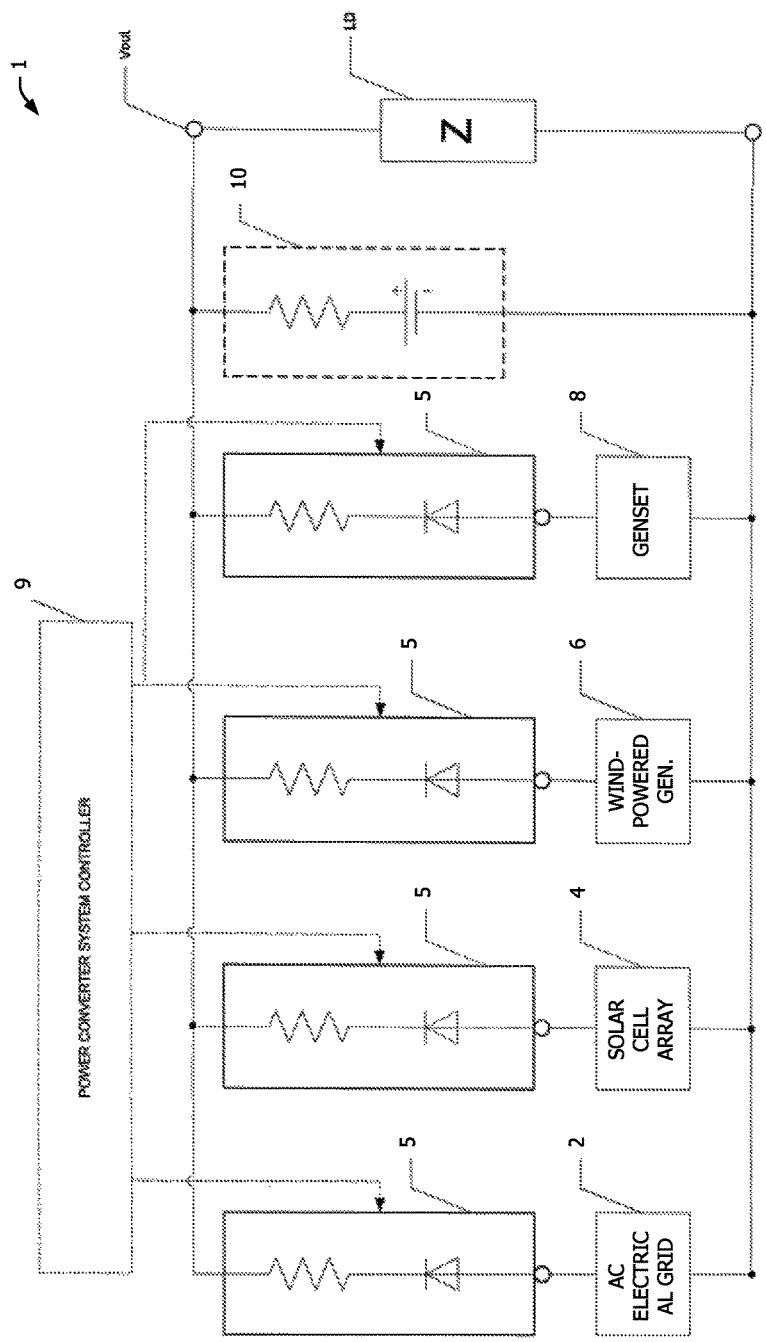
FIG. 1 is an electrical diagram, in block and schematic form, of a power converter system.

FIG. 1 is an electrical diagram, in block and schematic form, of a power converter system 1. In an exemplary embodiment, power converter system 1 includes a plurality of power converters 5 coupled to one of multiple various available power sources 2, 4, 6, 8. Each power converter 5 converts power received from one of power sources 2, 4, 6, 8, and applies the power to at least one load LD at an output power bus Vout. While a single power converter 5 is shown in FIG. 1 as being associated with each power source 2, 4, 6, 8, it is contemplated that multiple power converters 5 may be connected in a parallel group to simultaneously convert power from any or all of power sources 2, 4, 6, 8. In some embodiments, for example, each power converter 5 may include multiple power converters 5. Load LD may correspond to any facility that consumes DC electrical power, for example transceivers, antennae, and other electronic functions at a cellular telephone tower system; motors, lighting, switching gear, and other loads installed at a home or commercial facility; loads at smaller-scale systems such as intersection traffic signals; and the like.

In an exemplary embodiment, the available power sources include an AC electrical grid 2, a solar cell array 4, a wind-powered generator (i.e., wind turbine) 6, a genset 8, and a battery backup system 10. Other types of power sources may also be used in some embodiments, including geothermal electrical generators, water-powered generators, fuel cells, and the like. Of course, more or fewer power sources may be included within any particular power converter system installation. Battery backup system 10 is optionally included within this power converter system, to provide emergency power to load LD if all of power sources 2, 4, 6, 8 become unavailable or inadequate at a point in time. If so provided, battery backup system 8 would include charging circuitry for charging the available batteries from output power bus Vout, in effect becoming part of the effective load to power sources 2, 4, 6, 8 and power converters 5. In a co-generation context, load LD may correspond to the AC electrical grid itself, in which case an inverter (not shown) would receive power from output power bus Vout and produce AC power for stretch application to AC loads and the grid.

As will become apparent from the following description, each power converter 5 may autonomously control its operation. In an exemplary embodiment, power converter system 1 optionally includes a power converter system controller 9. Even though power converter 5 may control its operation, power system controller 9 may still be provided for purposes of overall system monitoring, configuration and adjustment of various parameters (e.g., the target output DC voltage from each power converter 5), and the like.

In an exemplary embodiment, power converter system 1 is operated to preferentially convert power from one or more of power sources 2, 4, 6, 8 relative to one other, for example, to favor drawing power from renewable sources first, using power from the grid or from a diesel generator when necessary (e.g., when power from solar and wind sources is insufficient), and relying on battery backup power only in emergencies. This prioritization minimizes the consumption of metered power and, in the environmentally-sensitive sense, minimizes the consumption of power from fossil-fuel sources. Application of this priority scheme to the system of FIG. 1 would prioritize the use of power from solar cell array 4 and wind-powered generator 6 over power from AC electrical grid 2 and other fossil-fuel powered or metered power sources, such as genset 8. This prioritization may be accomplished by controlling power converters associated with renewable and other preferred power sources to output a specified higher DC output voltage than the DC output voltage from power converters associated with less-preferred power sources. For example, the highest priority power source may have its associated power converter operating at the highest DC output voltage (e.g., 54.0 volts) to preferentially draw power from that source. The next highest priority power source may have its power converter controlled to output power at a next highest output voltage (e.g., 54.0 volts), and the lowest priority power source may then its power converter outputting the lowest voltage (e.g., 53.9 volts). In the context of the system of FIG. 1 and according to some embodiments, this prioritized operation may be programmed into power converters 5 themselves, without requiring the supervisory external power system controller 9. Alternatively, the prioritization may be implemented by power system controller 9. In some embodiments, the prioritization is put into effect when the output load is above a certain user-set threshold for the load condition or for the supply condition. For instance, if the solar energy source is above a certain level (e.g. a sunny day and the solar panels exhibit enough current).

Figure 2:
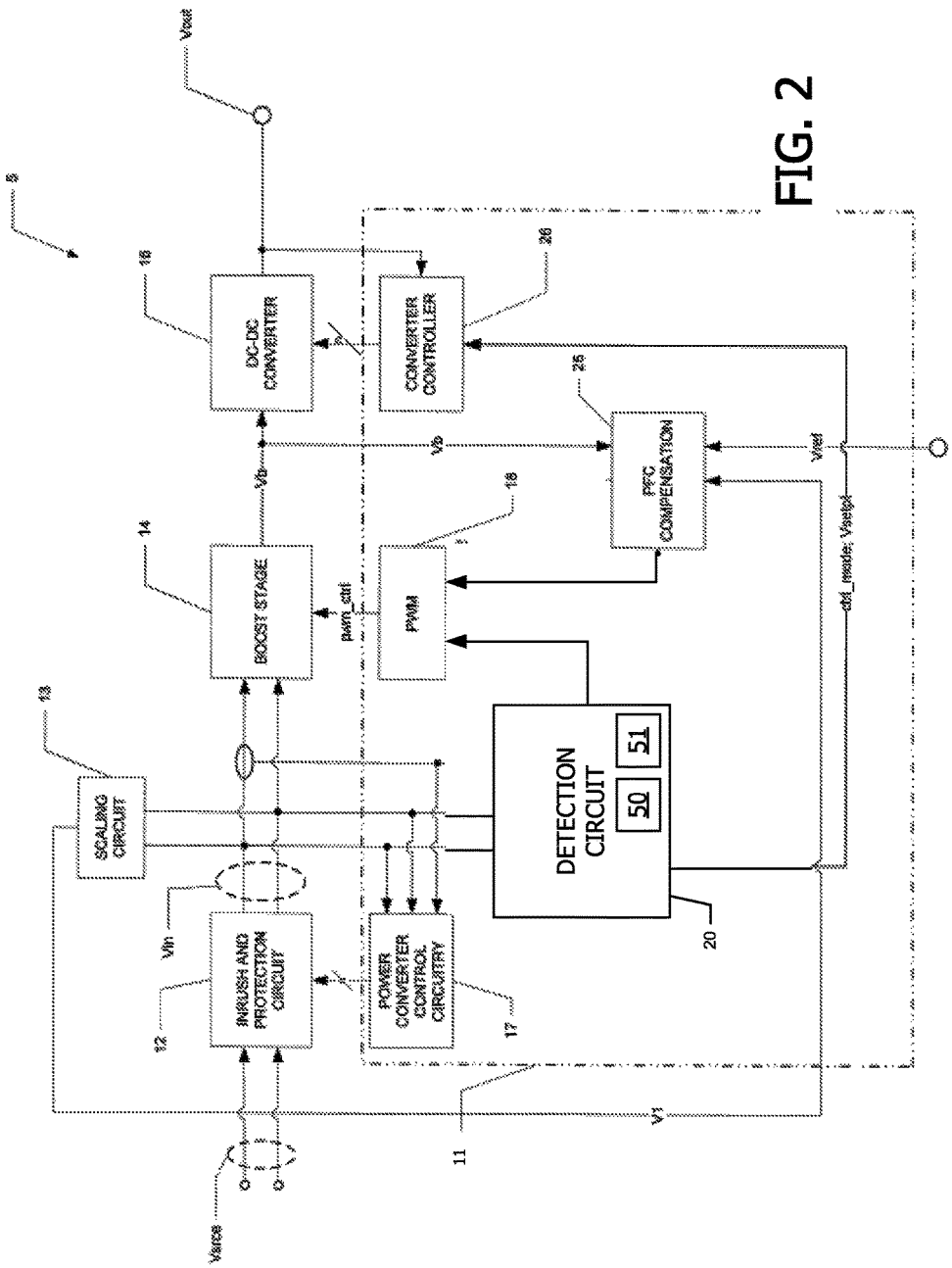
FIG. 2 is an exemplary block diagram of the power converter shown in FIG. 1.

FIG. 2 is an exemplary block diagram of power converter 5 (shown in FIG. 1). While shown in FIG. 2 as a single phase converter, power converter 5 could be a three-phase converter or any other type of converter that would enable power converter 5 to function as described herein. In an exemplary embodiment, power converter 5 receives power from a corresponding power source 2, 4, 6, 8 at terminal Vsrce. Power converter 5 includes an input conditioning circuit 12 coupled to terminal Vsrce and configured to filter and to suppress and reduce electromagnetic interference (EMI), power surges and inrushes. In one embodiment, input conditioning circuit 12 includes sections that are devoted to AC or DC type inputs. The section for DC may be configured to suppress and reduce input noise, power surges and inrushes, and the like. It may optionally include circuitry to include or isolate sections of this circuit based on input source type indicated from a detection circuit 20. Depending on the type of input power source connected to terminal Vsrce, the power received at terminal Vsrce may be one of AC power having a relatively stable frequency (e.g., 50 Hz or 60 Hz) such as received from AC grid 2 or genset 8, AC power having either constant or somewhat variable frequency such as generated by wind-powered generator 6, or DC power such as generated by solar cell array 4.

Each power converter 5 will utilize the most preferred operating algorithm for the applied source type and operate to optimize energy harvest and system reliability. In an exemplary embodiment, power converter 5 is a two-stage converter, including a first, boost stage 14 followed by a second (e.g. isolating), DC-DC converter stage 16. Together, boost stage 14 and DC-DC converter 16 form a power converter circuit.

In an exemplary embodiment, boost stage 14 receives conditioned input power Vin from input conditioning circuit 12, which is in the same general form as the power received at terminal Vsrce. Boost stage 14 operates to produce a voltage at DC bus Vb that is typically higher than the voltage of the power received at terminal Vsrce. Boost stage 14 follows conventional design for boost stages; it is contemplated that boost stage 14 may alternatively be constructed according to any one of a number of other design approaches known in the art, or as may be subsequently developed for such boost stages.

In an exemplary embodiment, power factor correction (PFC) compensation circuit 25 is a feedback control system that ensures boost stage 14 output voltage is regulated according to a setpoint and optionally ensures a high power factor when detection circuit 20 determines the input source is an AC power source. PFC compensation circuit 25 further enables pulse width modulator 18 to control boost stage 14 to limit boost stage output voltage Vb if input type is DC or operate at a near-unity power factor in converting power from the AC grid or fuel-powered generators. In other words, according to these disclosed embodiments, the operation of boost stage 14 is controlled in a manner that depends upon the nature of the power received at terminal Vsrce, and thus according to the type of power source delivering that energy.

In an exemplary embodiment, DC-DC converter stage 16 receives the output of boost stage 14 at DC bus Vb. DC-DC converter stage 16 conditions the output from boost stage 14 into a form acceptable for a particular load. The manner in which converter controller 26 operates depends upon the nature of the power received at terminal Vsrce, and thus depends upon the type of power source delivering that energy, as detected by detection circuit 20 and communicated to DC-DC converter stage 16 by way of control signals. In some embodiments, converter controller 26 controls DC-DC converter stage 16 to use feedback control to regulate the output voltage appearing at terminal Vout for some power sources (e.g., the AC grid and genset), and to operate DC-DC converter stage 16 in an "open loop" fashion, for example at its resonant frequency of the inductor 36 and capacitor 38 and with boost stage 16 regulating the output voltage, for power from other power sources (e.g., renewable power sources).

It is contemplated that power converter 5 (shown in FIG. 2) may be implemented in any one of a number of physical implementations. In particular, it is contemplated that the control circuitry including any or all of detection circuit 20, PFC compensation circuit 25, converter controller 26, and pulse width modulator 18, may be realized in the digital domain, for example by one or more single or multiple chip digital signal processor (DSP) 11 as indicated in FIG. 2. If implemented in that manner, DSP 11 would include the necessary programmable logic circuitry or other programmable logic such as field programmable gate array (FPGA) for executing corresponding program instructions to carry out the functions corresponding to those circuits as described in this specification; volatile and non-volatile program and data memory storing those program instructions to be executed may reside within DSP 11 itself, or may be stored in a memory resource (not shown) external to DSP 11. Other functions within power converter 5, including boost stage 14 and isolating DC-DC converter stage 16 will typically be realized by discrete components, especially considering the high power levels that are the subject of the power conversion, and the inductors and transformers implemented in those stages.

As noted above, the manner in which boost stage 14 and DC-DC converter stage 16 are controlled depends on the type of power source to which power converter 5 is connected. In an exemplary embodiment, detection circuit 20 determines the type of power source at its input based on at least one characteristic of the received source power. The at least one characteristic may be one or more of a voltage, a current, a frequency, a phase, a DC offset, an impedance, a power factor, a harmonic content or any other characteristic of interest. In an exemplary embodiment, the characteristic is voltage. Detection circuit 20 is configured to identify the type of the power source based on the characteristic. For example, conventional solar cell arrays 4 typically generate DC power, with the power output depending on the intensity of the solar energy being converted. Wind-powered generators 6 typically generate AC power, but at a relatively constant or variable frequency that varies with wind velocity. A voltage signal from AC electrical grid 2 or genset 8 is typically at a relatively constant frequency, for example 50 Hz or 60 Hz. By monitoring the voltage signal over a substantial period of time, interruptions or substantial frequency variations may occur by which it can be inferred whether the power source is a fossil-fuel-powered AC backup generator or the commercial electric power grid. Other power sources may supply power that have a signature similar to these, or may have a different behavior from these types. In an alternative embodiment, detection circuit 20 is configured to identify the power source type by receiving data indicating the identity of a power source from a memory associated with the power source or a database separate from the power source. In addition, power converter system controller 9 can determine through generator monitoring if a generator is running in the system. Power converter system controller 9 may be used in conjunction with detection circuit 20.

In an exemplary embodiment, based on a determination of the type of the power source as described above, detection circuit 20 can determine whether the input power source is a soft AC power source, for example, a power source that cannot deliver enough current to clear 20-30 Amp input fuses. Wind-powered generator 6 and genset 8 are examples of soft AC sources. In some embodiments, power converter 5 may store identifying information associated with the particular soft AC source for faster identification in the future. If detection circuit 20 determines that the power source is of a different type, power converter 5 proceeds with energy harvesting using methods known in the art.

Figure 3:
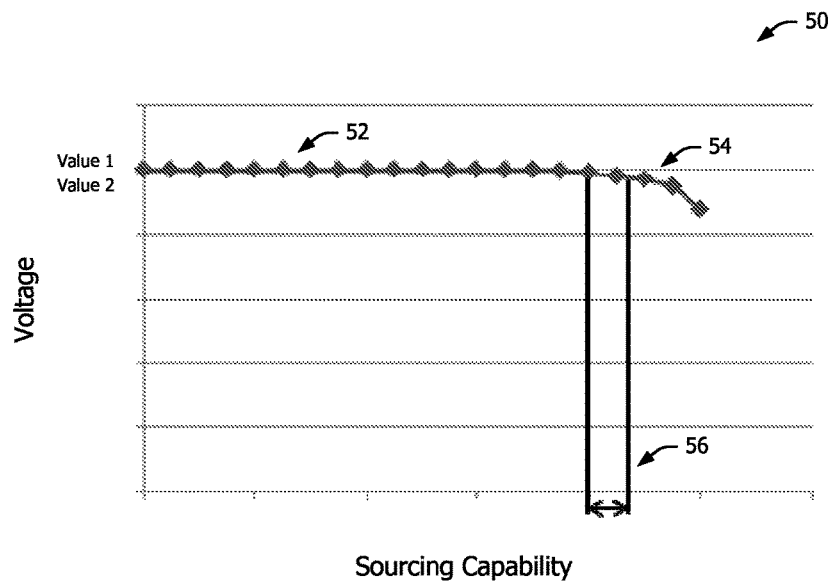
FIG. 3 is a graph illustrating a parameter set that may be used by the soft AC source controller shown in FIG. 2 to determine a region of operation for a soft AC input power source.

FIG. 3 is a graph 50 illustrating a parameter set that may be used by detection circuit 20 to determine a region of operation for a soft AC input power source. In an exemplary embodiment, detection circuit 20 observes at least one operating parameter 52 of the soft AC source as the power source approaches its operational limit in order to determine an operating edge of the soft AC source. Parameters that may be observed include, but are not limited to, voltage, frequency, period, duty cycle, distortion, and/or any other set of operating bounds that may be passed as operating domain edges. In an exemplary embodiment, output voltage of the power source is shown on the y-axis and a sourcing capability of the power source is shown on the x-axis. Voltage is one parameter that varies as a soft AC source approaches the edge of its capability. Generally, the output voltage of a soft AC source will droop near the edge of its operation. By observing this droop, detection circuit 20 can find the highest output voltage of the soft AC source before output current drops off appreciably, which is commonly referred to as a "knee" 54.

Detection circuit 20 sets a maximum operating point of power converter 5 near the knee to utilize a full capacity of the soft AC source. In one embodiment, detection circuit 20 determines the knee and operates power converter 5 at a fraction or percentage of the soft AC source capacity, for example, at about 80% of the capacity. In another embodiment, detection circuit 20 determines the knee and provides a region of operation 56 such that power converter 5 can margin output voltage up or down relative to changes in load demand and/or changes in power supplied by other power sources. For example, if the observed parameter is voltage sag, a user can specify that voltage of the soft AC source cannot droop more than 3%. Detection circuit 20 monitors the input voltage and adjusts its output at the DC bus as necessary. When embedded in a system, power converter system controller 9 manages power converters 5 that are online to assist detection circuit 20 in determining the knee. Power converter system controller 9 achieves this by managing loads LD on all system converters by turning them down as necessary.

Parameters used for operational edge detection may be provided to detection circuit 20 from a database associated with the power source on a source-by-source basis. For example, if the power source is genset 8, sag and/or slew rates for that particular genset 8 may be provided to power converter 5 so that detection circuit 20 can recognize a signature within an incoming voltage signal of genset 8 as it approaches its operational limit.

In one embodiment, the soft AC source provides detection circuit 20 with a prescribed sag or optimum operational point for a given source feeding a set of understood loads. The prescribed sag and/or optimum operational point may be stored in a database associated with and communicated by one of the soft AC source or controller 9. During operation, power converter 5 monitors the soft AC source for the voltage sag and delivers power to the load as needed to maintain the optimum operational point.

The following description is an example of operation of power converter 5 where a wind-powered generator 6 is the soft AC power source supplying power to power converter 5. In an exemplary embodiment, upon supplying power to power converter 5, wind-powered generator 6 transmits a control signal to detection circuit 20 that includes a characterization of wind-powered generator 6 as a soft AC source and a prescribed voltage sag for wind-powered generator 6. Detection circuit 20 determines the knee of wind-powered generator 6 based on the prescribed voltage sag and operates it near the knee. To maintain the output voltage of wind-powered generator 6 near the knee in a wind-powered generator application, power converter 5 adjusts a trim of the rotor blades to maintain an optimum angle of attack relative to the wind to extract maximum energy from the wind generator. In addition to changing load conditions, input power from wind-powered generators can be highly variable, so power converter 5 may periodically recalculate the knee and determine a new operating range to maximize power delivery from wind-powered generator 6. Departure over the knee will result in rapid fold back of the wind turbine blades to prevent stalling.

In an exemplary embodiment, detection circuit 20 is also configured to control operation of wind-powered generator 6 in a pump mode to increase the power transferred due to the inertia in attached airflow as a blade of wind-powered generator 6 approaches stall. In the pump mode, detection circuit 20 is programmed with both a time constant parameter that limits the time wind-powered generator 6 is allowed to operate over the edge of the knee and a time required for reattachment. An example of the parameter list for pumped operation may include: maximum power=f(voltage droop, max time over max droop, recovery time after max droop). This would result in a pumping operation around a given value of voltage droop.

Figure 4:
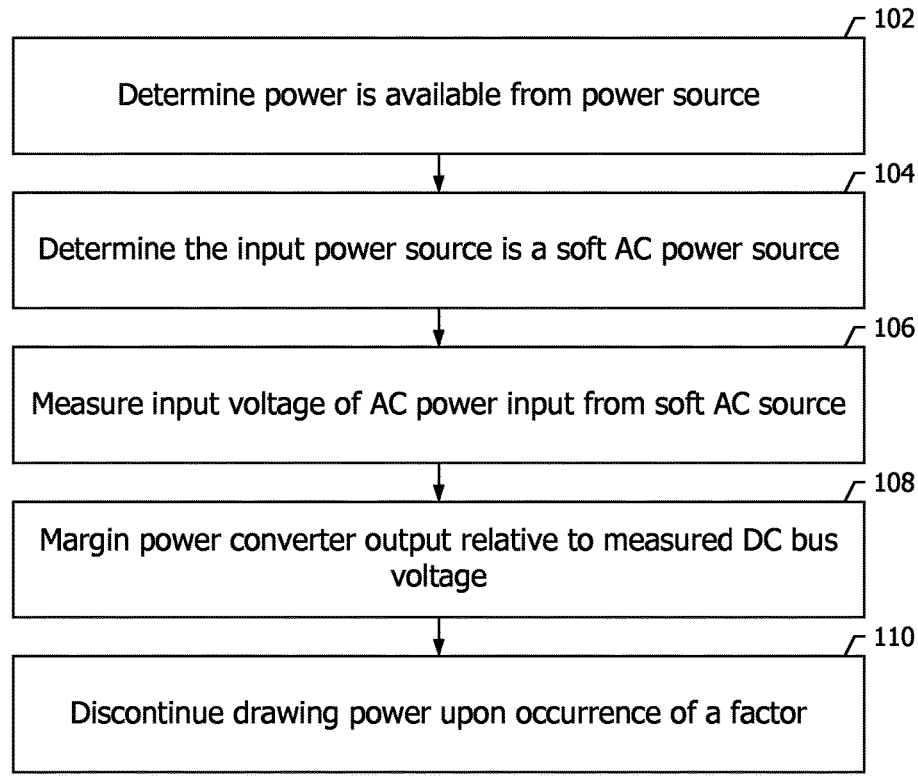
FIG. 4 is a flowchart of an exemplary method of increasing power delivered by a soft AC power source in the power converter system shown in FIG. 1.

FIG. 4 is a flowchart of an exemplary method 100 of increasing power delivered by a soft AC power source in power converter system 1 (shown in FIG. 1). In an exemplary embodiment, power converter system 1 includes at least one power converter 5 that receives power from AC electrical grid 2, solar cell array 4, wind-powered generator 6, and genset 8. In an exemplary embodiment, power converter 5 determines 102 that power is available from a power source unknown to power converter 5. Detection circuit 20 of power converter 5 determines 104 that the input power source is a soft AC source and transmits a control signal notifying detection circuit 20. For explanation purposes, in the present embodiment, power converter 5 is receiving power from genset 8. Alternatively, rather than power converter 5 determining the type of power source, power converter system controller 9 (shown in FIG. 1) may transmit a command signal to detection circuit 20 with instructions to behave as a soft source power converter. Detection circuit 20 monitors a parameter, for example, voltage sag, as genset 8 approaches its operational limit to determine the knee, as described above. A region of operation for genset 8 is set across the knee such that voltage is not allowed to droop past a specified percentage of the knee.

In an exemplary embodiment, detection circuit 20 measures 106 an open circuit voltage of the AC input power being received from genset 8 using any known measuring method known in the art. Because there are a plurality of power converters 5 coupled in parallel to receive power from the various power sources and to feed the DC bus, power conversion system 1 applies cascadingly decreasing voltage levels to power supplies 2, 4, 6, 8 (54V, 54V, 53V, 53V) to take advantage of voltage droop characteristics to ensure that no single power source will be able to provide all the current to load LD. The voltage levels may be different for different applications.

Detection circuit 20 margins 108 output voltage Vout of power converter 5 relative to a measured DC bus voltage Vbus. By margining up its output voltage Vout, power converter 5 for genset 8 is able to provide more voltage than any one of power sources 2, 4, or 6 and accordingly, genset 8 sources all of the current for load LD. For example, if genset 8 has the lowest priority for providing power to load LD, but has available power, power converter 5 margins up the voltage of genset 8 to provide the power. Additionally, margining up/down enables detection circuit 20 to control genset 8 to operate back and forth across the knee within the operating region of genset 8. Being able to adjust its output voltage enables detection circuit 20 to control an amount of power processed by genset 8. Additionally, or alternatively, in a system configuration, power converter system controller 9 may assist in the determination. In some embodiments, by raising the output, controller 9 can put more load on the unit under determination at the same voltage to determine the knee.

In an exemplary embodiment, detection circuit 20 discontinues 110 drawing power from genset 8 upon the occurrence of one of: (1) the input voltage Vin sags by a specified percentage (i.e., 5%, 10%, etc.) from the measured open circuit voltage, (2) when the power capability of power converter 5 is reached, or (3) when the output voltage of the DC bus rises a specified amount (i.e., 0.5V, 1.0V, 2.5V) above a voltage directed by power converter system controller 9. Alternatively, this may be done at the system level by turning down other power converters 5.

Detection circuit 20 then margins 112 the power transfer to maintain an input voltage sag between a predetermined range, for example, between approximately 3% and approximately 5%. The two boundary thresholds are parameters that may be adjusted internally within power converter 5 or through communications with power converter system controller 9 on a rectifier slot by rectifier slot basis. This allows the voltage sag and time constant for a given power source to be characterized in a lab during manufacture. Once the parameters for that particular source are established, the parameters can be dispensed in the field on a rectifier slot by rectifier slot basis. The parameter list may include—minimum sag percent, maximum sag percent, maximum slew rate in percent per second.

The detection circuit 20 described herein is implemented by a processor 50 communicatively coupled to a memory device 51 for executing instructions. In some embodiments, executable instructions are stored in memory device 51. Alternatively, controller 51 may be implemented using any circuitry that enables detection circuit 20 to control operation of power converters 5 as described herein. For example, detection circuit 20 determines an optimum operation region for a soft AC power source and monitors the soft AC source to make sure it operates within the region. Detection circuit 20 may provide individual setpoints for each power converter 5, which enables renewable power sources to take priority in providing power to the DC bus. Detection circuit 20 determines the "knee" of the soft AC source and sets a range of operation based on the "knee". In some embodiments, when there are multiple loads on a soft AC source, detection circuit 20 cooperates to use power available from that soft AC source when additional loads are added and regulates power distribution when another load is added and pushes the soft AC source over its operational edge.

In the exemplary embodiment, detection circuit 20 performs one or more operations described herein by programming processor 50. For example, processor 50 may be programmed by encoding an operation as one or more executable instructions and by providing the executable instructions in memory device 51. Processor 50 may include one or more processing units (e.g., in a multi-core configuration). Further, processor 50 may be implemented using one or more heterogeneous processor systems in which a main processor is present with secondary processors on a single chip. As another illustrative example, processor 50 may be a symmetric multi-processor system containing multiple processors of the same type. Further, processor 50 may be implemented using any suitable programmable circuit including one or more systems and microcontrollers, microprocessors, reduced instruction set circuits (RISC), application specific integrated circuits (ASIC), programmable logic circuits, field programmable gate arrays (FPGA), and any other circuit capable of executing the functions described herein. In the exemplary embodiment, processor 50 causes detection circuit 20 to operate soft AC power sources, as described herein.

In an exemplary embodiment, memory device 51 is one or more devices that enable information such as executable instructions and/or other data to be stored and retrieved. Memory device 51 may include one or more computer readable media, such as, without limitation, dynamic random access memory (DRAM), static random access memory (SRAM), a solid state disk, and/or a hard disk. Memory device 51 may be configured to store, without limitation, application source code, application object code, source code portions of interest, object code portions of interest, configuration data, execution events and/or any other type of data.

In an exemplary embodiment, power converter 5 is manufactured as a single piece of power electronics (standard hardware) and is configured to accept power from any soft AC power source, including a genset and a wind-powered generator. This reduces the number of parts that must be spared to keep a network working and available for customer use. Moreover, a single power converter 5 can be used to convert power from multiple source types, e.g., solar, wind, water, geothermal, commercial grid, emergency generator or backup battery. A service provider need only stock the single converter type to ensure converter spare availability for any source.

A technical effect of the systems and methods described herein includes at least one of: (a) determining a power source type based on at least one characteristic of power received from a power source; (b) when a soft AC source is determined to be the power source type, determining an operating edge of the soft AC source by monitoring at least one parameter as the soft AC power source approaches a power limit; and (c) receiving a control signal at a detection circuit of a power converter when the power converter receives power from a soft AC power source.

As compared to at least some known power systems, the systems and methods described herein facilitate increasing power delivery of soft AC power sources in power converter systems by optimizing the operating region of the soft AC source. A power converter determines a monitors a parameter near a power limit of the soft AC source to determine the operational edge. The power converter controls power delivered to a load to maintain operation of the soft AC source within the operating region. The power converter described herein enables a more complete utilization of soft AC sources, such as wind-powered generators, gensets, inverters, and other green energy sources. The power converter described herein further enables the use of smaller, lower cost versions of the same soft AC sources. For example, lower cost smaller gensets support an identical telecom load by using the power converter described herein.

Exemplary embodiments of systems and methods for power converters are described above in detail. The systems and methods are not limited to the specific embodiments described herein but, rather, components of the systems and/or operations of the methods may be utilized independently and separately from other components and/or operations described herein. Further, the described components and/or operations may also be defined in, or used in combination with, other systems, methods, and/or devices, and are not limited to practice with only the systems described herein.

The order of execution or performance of the operations in the embodiments of the invention illustrated and described herein is not essential, unless otherwise specified. That is, the operations may be performed in any order, unless otherwise specified, and embodiments of the invention may include additional or fewer operations than those disclosed herein. For example, it is contemplated that executing or performing a particular operation before, contemporaneously with, or after another operation is within the scope of aspects of the invention.

Although specific features of various embodiments of the invention may be shown in some drawings and not in others, this is for convenience only. In accordance with the principles of the invention, any feature of a drawing may be referenced and/or claimed in combination with any feature of any other drawing.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

What is claimed is:

1. A power converter for supplying power to a load, the power converter comprising:
 a detection circuit in signal communication with a controller, the detection circuit configured to:
  determine a power source type based on at least one characteristic of power received from a power source;
  monitor at least one parameter of a soft AC power source;
  determine, in response to detecting a change in the monitored parameter that satisfies a predefined amount of change, an operating edge of the soft AC power source, wherein the operating edge is indicative of a power output of the soft AC power source at which the detected change occurs and wherein the operating edge is less than a total amount of power that the soft AC power source is capable of producing;
  calculate a scaled operating point associated with the soft AC power source that is less than the determined operating edge; and
  utilize the scaled operating point in association with the soft AC power source.

2. A power converter in accordance with claim 1, wherein to determine the operating edge of the soft AC power source, said detection circuit is further configured to monitor a voltage droop of the soft AC power source as the soft AC power source approaches a power limit.

3. A power converter in accordance with claim 2, wherein to monitor a voltage droop, said detection circuit is further configured to determine a highest output voltage of the soft AC power source before current begins to drop as the soft AC power source approaches the power limit.

4. A power converter in accordance with claim 1, wherein to determine the operating edge of the soft AC power source, said detection circuit is further configured to monitor at least one of frequency, period, duty cycle, variations of frequency, components of current and voltage of power factor, phase differences in current and voltage, flip angle variations between current and voltage, and distortion.

5. A power converter in accordance with claim 1, wherein said detection circuit is further configured to determine a region of operation for the soft AC power source based on the determined operating edge.

6. A power converter in accordance with claim 1, wherein said detection circuit is further configured to operate the soft AC power source at the scaled operating point to deliver power to a load.

7. A power converter in accordance with claim 1, wherein the soft AC power source is a wind-powered generator.

8. A power converter in accordance with claim 7, wherein said detection circuit is further configured to operate the wind-powered generator over the operating edge in a pump mode for a predetermined time to increase the power transferred due to inertia in airflow as a blade of the wind-powered generator approaches stall.

9. A power converter in accordance with claim 1, wherein to utilize the scaled operating point in association with the soft AC power source, said detection circuit is further configured to:
  determine a knee voltage of the soft AC power source, the knee voltage corresponding to a maximum output voltage of the soft AC power source;
  set the scaled operating point to be near the knee voltage to utilize a full capacity of the soft AC power source.

10. A power converter in accordance with claim 1, wherein the power source comprises a plurality of power sources, and wherein the controller is configured to prioritize the conversion of power from each power source of the plurality of power sources relative to one another based upon predetermined parameters.

11. A method comprising:
  coupling a power source to a load;
  determining a power source type based on at least one characteristic of power received from the power source;
  when a soft AC power source is determined to be the power source type, monitoring at least one parameter of the soft AC power source;
  determining, in response to detecting a change in the monitored parameter that satisfies a predefined amount of change, an operating edge of the soft AC power source, wherein the operating edge is indicative of a power output of the soft AC power source at which the detected change occurs and wherein the operating edge is less than a total amount of power that the soft AC power source is capable of producing;
  calculating a scaled operating point associated with the soft AC power source that is less than the determined operating edge; and
  utilizing the scaled operating point in association with the soft AC power source.

12. A method in accordance with claim 11, wherein determining the operating edge of the soft AC power source comprises monitoring a voltage droop of the soft AC source as the soft AC power source approaches a power limit.

13. A method in accordance with claim 11, wherein determining the operating edge of the soft AC power source comprises monitoring at least one of frequency, period, duty cycle, and distortion.

14. A method in accordance with claim 11, further comprising determining a region of operation for the soft AC power source based on the determined operating edge.

15. A method in accordance with claim 14, further comprising:
  measuring a voltage of AC input power being received; and
  margining output voltage relative to a measured DC bus voltage to provide power to a load while maintaining operation of the soft AC power source within the region of operation.

16. A method in accordance with claim 11, further comprising prioritizing the conversion of power from each power source of a plurality of power sources relative to one another based upon predetermined parameters.

17. A power converter system comprising:
  a plurality of power sources;
  a direct current (DC) bus for providing power to at least one load; and
  a power converter comprising a detection circuit configured to:
    determine a power source type based on at least one characteristic of power received from a power source;
    monitor at least one parameter of a soft AC power source;
    determine, in response to detecting a change in the monitored parameter that satisfies a predefined amount of change, an operating edge of the soft AC power source, wherein the operating edge is indicative of a power output of the soft AC power source at which the detected change occurs and wherein the operating edge is less than a total amount of power that the soft AC power source is capable of producing;
    calculate a scaled operating point associated with the soft AC power source that is less than the determined operating edge; and
    utilize the scaled operating point in association with the soft AC power source to increase power delivery of the soft AC power source.

18. A power converter system in accordance with claim 17, wherein to determine the operating edge of the soft AC power source, said detection circuit is further configured to monitor at least one of voltage droop, frequency, I/frequency, duty cycle, variations of frequency, components of current and voltage of power factor, phase differences in current and voltage, flip angle variations between current and voltage, and distortion of the soft AC power source as the soft AC power source approaches a power limit.

19. A power converter system in accordance with claim 17, wherein said detection circuit is further configured to determine a region of operation for the soft AC power source based on the determined operating edge.

20. A power converter system in accordance with claim 17, further comprising a controller configured to prioritize the conversion of power from each power source of the plurality of power sources relative to one another based upon predetermined parameters.

\* \* \* \* \*